Oct. 17, 1950 G. P. RALSTON 2,525,944
LAWN EDGER
Filed Feb. 28, 1949
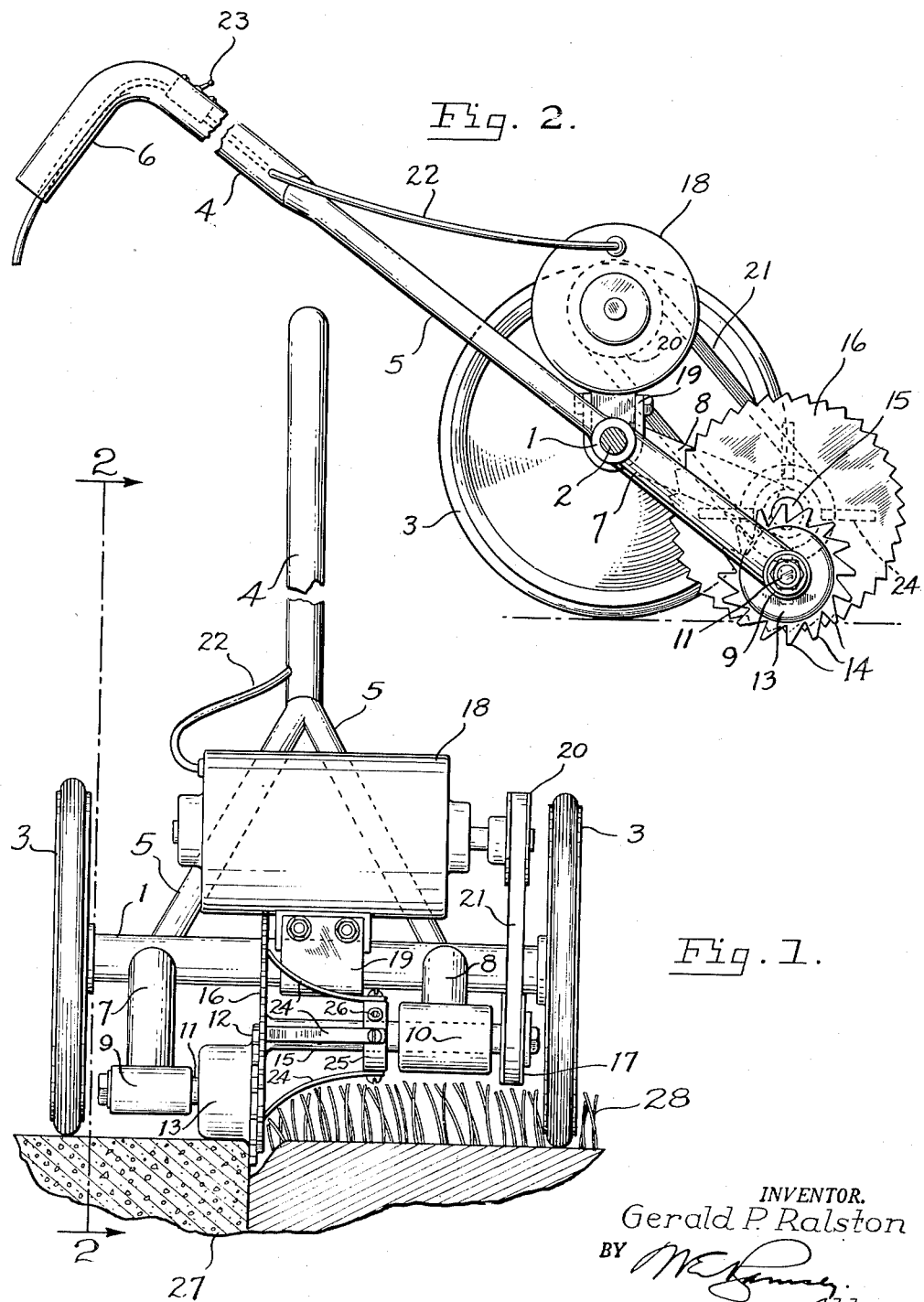
INVENTOR.
Gerald P. Ralston
BY
Atty.

Patented Oct. 17, 1950

2,525,944

UNITED STATES PATENT OFFICE 2,525,944

LAWN EDGER

Gerald P. Ralston, Portland, Oreg.

Application February 28, 1949, Serial No. 78,770

5 Claims. (Cl. 56—25.4)

My invention pertains to lawn edgers, and relates particularly to the novel construction of a lawn edger by which a positive and high-speed shearing action is obtained.

It is a principal object of my invention to provide a lawn edger in which said shearing action is obtained by the coaction of a powered, high-speed, rotary cutting blade and a freely rotating, low-speed edger blade.

Another important object of my invention is the provision of a lawn edger in which a freely rotating edger blade is employed both to produce a shearing action with a high-speed cutting blade and as a depth gauge to space said cutting blade out of contact with the soil and other objects which might cause injury to said high-speed blade.

A further object is the provision in a lawn edger, having a high-speed cutting blade, of flexible cutting members which extends laterally and arcuately from said cutting blade to profile the grass adjacent the borders being trimmed.

These and other objects and advantages of my invention will appear from the following detailed description taken in connection with the accompanying drawing, in which:

Fig. 1 is a front elevation of a lawn edger embodying the features of my invention; and Fig. 2 is a side elevation of said lawn edger, partly in section, taken along the line 2—2 in Fig. 1.

In a lawn edger embodying my invention, a transverse tubing 1 forms a frame and housing for the rotatable axle 2. Wheels 3 are mounted on the ends of said axle to support the frame above the ground. A handle member is secured at one end to the tubing 1 and extends rearwardly thereof for use in guiding and manipulating the edger during operation. The preferred form of handle as shown in the drawing comprises a tubular shaft 4 which is joined at one end to the converging ends of diverging members 5. The spaced ends of members 5 are secured to the tubing 1. The terminal end of shaft 4 is bent obliquely to form a hand grip 6 by which the edger is conveniently manipulated. This form of frame and handle provides a sturdy but light-weight structure of simple design.

Secured to and extending forwardly of the tubing 1 is a pair of laterally spaced arms 7 and 8. The terminal ends of said arms are provided with bearings 9 and 10, respectively, the bores of which extend parallel with the bore of tubing 1. A shaft 11 is mounted removably for rotation in bearing 9. Said shaft is held against lateral displacement in the bearing by any of the methods well-known in the art. To the inwardly facing end of shaft 11 is mounted an edger wheel 12 having an enlarged hub 13 projecting laterally therefrom. The periphery of the edger wheel is serrated, forming a series of elongated teeth 14 having blunted ends. The edger wheel may be secured detachably to the shaft 11 by such conventional means as a recessed set screw, not shown.

A shaft 15 is mounted intermediate its ends for rotation in bearing 10. A sharp toothed circular cutting blade 16 is secured to the inwardly facing end of said shaft. The blade may be mounted in any desired manner. A pulley 17 is mounted upon the outwardly facing end of shaft 15. A drive motor, such as the electric motor 18, is mounted detachably upon the tubing 1 by means of the removable clamp 19. A pulley 20 on the drive shaft of said motor is interconnected with the pulley 17 by means of a drive belt 21. An electric cord 22 leads from the motor 18 through the hollow handle 4 to a source of electric current. A toggle switch 23 in said cord is mounted adjacent the hand grip 6 for convenience in starting and stopping the motor.

It is to be observed that the edger wheel 12 and power-driven cutting blade 16 are disposed in parallel planes closely adjacent but out of contact with each other, and that said wheel and blade rotate in planes parallel with the line of movement of the lawn edger. The relative positions of shafts 11 and 15 are determined by the relative diameters of wheel 12 and blade 16, respectively. Thus, said shafts are so arranged that edger wheel 12 extends beyond the periphery of blade 16 at the point where contact is made with the ground. In this manner the edger wheel will strike the ground or other objects first and thereby prevent possible damage to the cutting blade 16.

It is frequently desired that the edges of the lawn being trimmed also be profiled to present a more pleasing appearance. This may be accomplished by the simple means provided in my invention. Said means comprises a series of concavely curved flexible blades 24 which are secured at one end in spaced intervals about a collar 25 and at the opposite end to the inner face of the cutting blade 16 adjacent the periphery thereof. The collar 25 is arranged to be secured detachably to the shaft 15 by such means as a set screw 26. The flexible blades are sharpened along their leading edge and curve in a concave arc intermediate their ends to cut a convex profile in the edge of the lawn. The degree of curvature of said flexible blades may be varied within limits by moving the collar 25 toward or away from the cutting blade 16.

The operation of the lawn edger described hereinbefore is as follows: Let it be assumed, for the purpose of this discussion, that a lawn adjacent a concrete walk 27 is to be trimmed. The edger is positioned in such manner that the hub 13 of the edger wheel rests upon the walk and the edger wheel 12 abuts against the edge of said walk with the teeth 14 extending into the groove usually formed, or space usually existing, between the walk and the lawn. Switch 23 is then thrown to energize the drive motor 18, whereupon the cutting blade 16 is rotated at high speed. As the lawn edger is pushed forwardly, the blades of grass 28 which overhang the walk are drawn into the notches between the teeth 14 of the free rolling edger wheel 12 and the teeth of the cutting blade 16. These blades of grass are then cut by the positive shearing action produced by the relative circumferential speeds of the wheel 12 and the cutting blade 16. Simultaneously with the trimming operation described above, the rapidly rotating flexible blades 24 cut the grass adjacent the trimmed edge to form a convex profile.

It is evident that many details of construction of the above described device may be altered without departing from the spirit of the invention. For example, I have illustrated and described the source of power for the cutting blade as being an electric motor. It is to be understood that other power means, such as a gasoline engine, may be used. Also, it is contemplated that power for such cutting blade may be derived by providing a circular rack or spur gear on one of the wheels 3 and coupling it to the shaft 15 by means of a pinion in manner similar to the usual construction of manually driven lawn mowers.

I claim:

1. A lawn edger comprising a frame supported on wheels, laterally spaced arms extending from said frame, a toothed edger wheel rotatably mounted on one of said arms in a vertical plane parallel to the line of movement of said lawn edger, a toothed cutting blade rotatably mounted on the other of said arms in a vertical plane adjacent and parallel to said edger wheel, and means for producing a rotary shearing action between said cutting blade teeth and said edger wheel teeth.

2. A lawn edger comprising a frame supported on wheels, a toothed edger wheel rotatably mounted in a vertical plane parallel to the line of movement of said lawn edger, a toothed cutting blade rotatably mounted in a vertical plane adjacent and parallel to said edger wheel, flexible blades extending laterally in a concave curve from said cutting blade, and means for producing a rotary shearing action between said cutting blade teeth and said edger wheel teeth.

3. A lawn edger comprising a frame supported on wheels, a handle member extending from said frame, a toothed edger wheel rotatably mounted in a vertical plane parallel to the line of movement of said lawn edger, a toothed cutting blade rotatably mounted in a vertical plane adjacent and parallel to said edger wheel, the periphery of said edger wheel extending beyond the periphery of said cutting blade at a point of contact with the ground to prevent damage of said cutting blade, flexible blades extending laterally from said cutting blade, said flexible blades functioning to profile the grass adjacent the edge being trimmed, and power means for rotating said cutting blades at speeds greater than the rotation of said edger wheel whereby a shearing action is produced between said cutting blade and said edger wheel.

4. A lawn edger comprising a frame supported on wheels, a toothed edger wheel rotatably mounted in a vertical plane parallel to the line of movement of said lawn edger, a toothed cutting blade rotatably mounted in a vertical plane adjacent and parallel to said edger wheel, concave flexible blades extending transversely to said line of motion from the periphery of said cutting blade for rotation therewith, and means for producing rotation of said flexible blades and said cutting blade.

5. A lawn edger comprising a frame supported on wheels, laterally spaced arms extending from said frame, a toothed edger wheel rotatably mounted on one of said arms in a vertical plane parallel to the line of movement of said lawn edger, a toothed cutting blade rotatably mounted on the other of said arms in a vertical plane adjacent and parallel to said edger wheel, concave flexible blades extending transversely to said line of motion from the periphery of said cutting blade to the other of said arms, and means for rotating said flexible blades and producing a rotary shearing action between said cutting blade teeth and said edger wheel teeth.

GERALD P. RALSTON.

REFERENCES CITED

The following references are of record in the file of this patent:

UNITED STATES PATENTS

| Number | Name | Date |
| --- | --- | --- |
| 1,065,946 | Janson | July 1, 1913 |
| 1,837,741 | Wenrich | Dec. 22, 1931 |
| 1,861,104 | Wolf | May 31, 1932 |
| 2,039,029 | Pond | Apr. 28, 1936 |
| 2,148,841 | Senior | Feb. 28, 1938 |
| 2,185,659 | Chernow | Jan. 2, 1940 |
| 2,478,587 | La Bonte | Aug. 9, 1949 |
| 2,479,460 | Becker | Aug. 16, 1949 |